United States Patent [19]

Choi

[11] Patent Number: 5,188,311
[45] Date of Patent: Feb. 23, 1993

[54] APPARATUS FOR CONTROLLING REEL BRAKE OPERATION OF TAPE RECORDER

[75] Inventor: Hwan Y. Choi, Suweon, Rep. of Korea

[73] Assignee: Samsung Electronics Co., Ltd., Suwon, Rep. of Korea

[21] Appl. No.: 637,647

[22] Filed: Jan. 4, 1991

[30] Foreign Application Priority Data

Jan. 6, 1990 [KR] Rep. of Korea .................. 90-112

[51] Int. Cl.⁵ .............................................. G11B 15/18
[52] U.S. Cl. ...................................... 242/204; 360/85
[58] Field of Search ................... 242/204, 200, 201; 360/74.1, 85, 95

[56] References Cited

U.S. PATENT DOCUMENTS

| | | | |
|---|---|---|---|
| 4,635,146 | 1/1987 | Koda et al. | 360/96.3 |
| 4,747,564 | 5/1988 | Tsubota | 242/204 |
| 4,807,061 | 2/1989 | Yoon | 242/204 |
| 4,914,536 | 4/1990 | Yamanaka | 242/204 |
| 4,977,467 | 12/1990 | Kondo | 242/204 |
| 4,985,788 | 1/1991 | Kano et al. | 360/85 |

FOREIGN PATENT DOCUMENTS 57-74859  5/1982  Japan .................................... 360/85

*Primary Examiner*—Daniel P. Stodola
*Assistant Examiner*—John Q. Nguyen
*Attorney, Agent, or Firm*—Robert E. Bushnell

[57] ABSTRACT

An apparatus for controlling reel brake operation in which the reel brake operation may be controlled by using power transmitted from a tape loading motor. The apparatus includes a control cam, brake arms operatively engaged with the control cam, a crank and a slide lever connected with one end of the crank. The control cam, which is rotated by the tape loading motor, is mounted on a deck to control the brake operation. The control cam is provided with a geat at an upper center thereof, a transmitting pin erected at one side, reentrants and a projection formed at predetermined positions of a circumferential surface, and a stepped part.

10 Claims, 3 Drawing Sheets

APPARATUS FOR CONTROLLING REEL BRAKE OPERATION OF TAPE RECORDER

BACKGROUND OF THE INVENTION

This invention relates to a tape recorder and more, particularly, to an apparatus for controlling reel brake operation in which the reel brake operation can be controlled by using power transmitted from a tape loading motor.

In a conventional system, the solenoid and links are generally used to control the reel brake operation. However, there are problems in that the mutual operation of the links produces a noise and the use of the solenoid causes a rise in power consumption and cost. Further, there is also a problem in that the interconnection between the links necessitates a broad space, and as a result, it creates an obstacle for the miniaturization of the deck.

SUMMARY OF THE INVENTION

It is an object of the present invention to provide an apparatus for controlling reel brake operation of a tape recorder comprising a control cam, brake arms and a slide lever disposed on a deck. By providing a configuration, the present invention overcomes the above-mentioned problems and control of all the operations may be accomplished by using both power at the tape loading without a separate power supply and a control cam provided with a stepped part and reentrants.

To accomplish the above object, there is provided an apparatus for controlling reel brake operation of a tape recorder comprising: a control cam, rotated by power, transmitted from a tape loading motor; brake arms, operatively engaged with the control cam, for controlling both reels simultaneously or selectively; a crank rotated by said control cam; a slide lever connected with one end of the crank and reciprocating horizontally in left and right directions; a tension arm rotated by engagement with the slide lever; and a tension band for braking or releasing the reels according to the operation of the tension arm.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENT

The present invention will now be described in more detail with reference to accompanying drawings.

Figure 1:
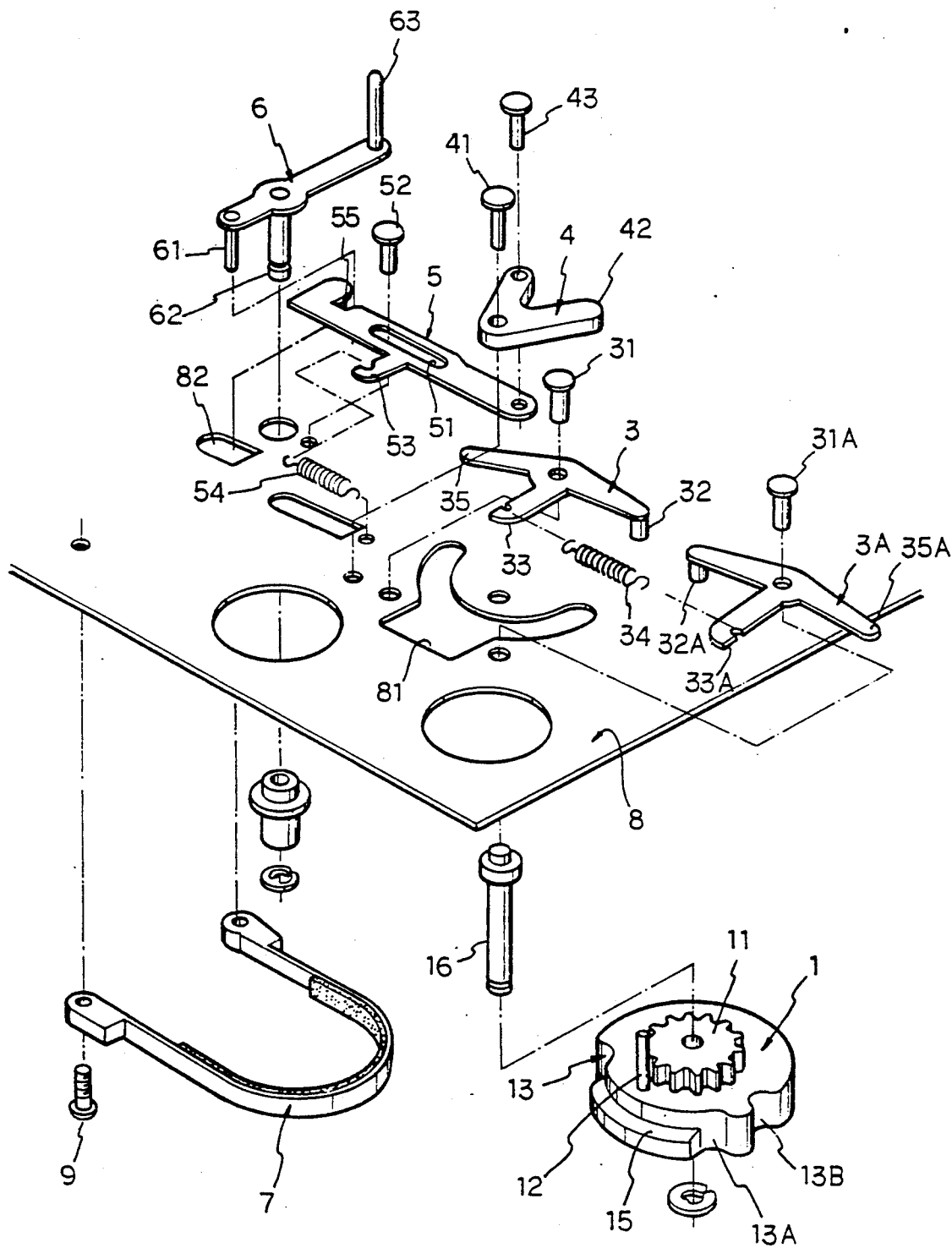
FIG. 1 is an enlarged view of an apparatus according to the present invention.

FIG. 1 is an enlarged view of an apparatus for controlling reel brake operation. A gear 11 is attached to a cam gear 1 at an upper center thereof to be rotated by power transmitted from a tape loading motor (not shown) via variable speed means. The cam gear 1 is provided with a transmitting pin 12 erected at one side thereof to rotate a crank 9 in accordance with position changes of the transmitting pin 12. Further, reentrants 13, 13A and 13B are formed at predetermined positions of a circumferential surface of the control cam 1. A projection 14 is formed between the reentrants 13A and 13B. A stepped part 15 is formed between the reentrants 13 and 13A. Further, the control cam 1 is rotated around a shaft 16 fixed to a lower part of a guide opening 81 with "Y" shape which is formed in a deck 8. Only the transmitting pin 12 is exposed to the upper direction of the deck 8 through the guide opening 81.

Conversely, brake arms 3 and 3A are disposed at both sides of the guide opening 81 and are rotated around shafts 31 and 31A mounted on the upper face of the deck 8, respectively. Each brake arm 3 and 3A is provided with interlocking pin 32 and 32A which are formed downward at an inner part of brake arm 3 and 3A and each having different length, respectively. The interlocking pins 32 and 32A are exposed to the lower direction of the deck 8 and contact with circumferential surfaces of the control cam 1. Each brake arm 3 and 3A is provided with a hanging piece 33 and 33A at a middle portion to hang one end of a tension spring 34 and pull the hanging pieces toward each other by using a compression of the tension spring 34. Further, the brake arms 3 and 3A are provided with a braking piece 35 and 35A at an output end to brake each reel 2 and 2A simultaneously or selectively according to each mode.

Further, a crank 4 is formed in "V" shape and is rotated around a shaft 41 mounted on the deck 8 to bring one end 42 of the crank 4 into contact with the transmitting pin 12. Transmitting pin 12, which is exposed to the upper direction of deck 8 at a predetermined position connects the second end 44 with a slider lever 5. A slide slot 51 is formed at the middle portion of the slide lever 5 in a longitudinal direction. The slide lever 5 is mounted on the deck 8 by a guide pin 52 which is fixed to the deck 8 through the slide slot 51.

Further, a hanging piece 53 is provided at the front middle portion of the slide lever 5 to hang a tension spring 54 between the hanging piece 53 and a hanging hole, and to pull the slide lever 5 toward the right direction. A combining recess 55 is formed at the outer end of the slide lever 5 to be engaged with a braking pin 61 which is provided at a front bottom portion of a tension arm 6.

Conversely, the tension arm 6 is rotated around a shaft 62 mounted on the deck 8. The braking pin 61 is exposed to the lower side of the deck 8 via a guide opening 82 to fit with one end of a tension band 7 and a tension pole 63 for tape is formed on the upper face of the tension arm 6. The tension band 7 is fixed to the bottom of the deck 8 via a screw 9 to brake a reel 2.

The operation of the present invention with the above configuration will now be explained in detail.

As shown in FIGS. 2(A)-(E), the operation of braking the reels 2 and 2A is carried out in accordance with the rotating operation of the control cam 1 by means of the tape loading motor (not shown) and the operations of the brake arms 3 and 3A and the slide lever 5 thereby.

Figure 2A:
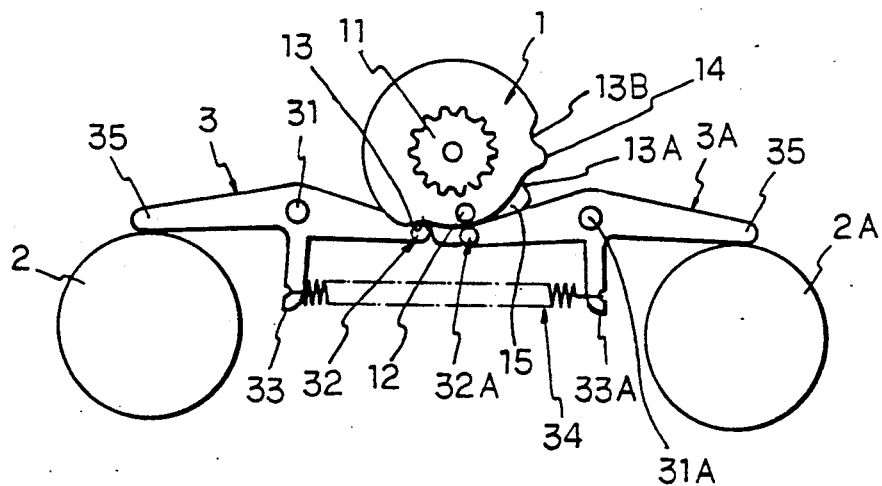
FIGS. 2(A)-(E) are plan views illustrating the operating states of the essential portion of the apparatus according to the present invention.

FIG. 2(A) illustrates the state before loading the tape. The braking pieces 35 and 35A contact with the reels 2 and 2A, respectively and the reels 2 and 2A are in a state of braking. At this time, the interlocking pin 32 is located in the reentrant 13 and the interlocking pin 32A is located on the stepped part 15.

Figure 2B:
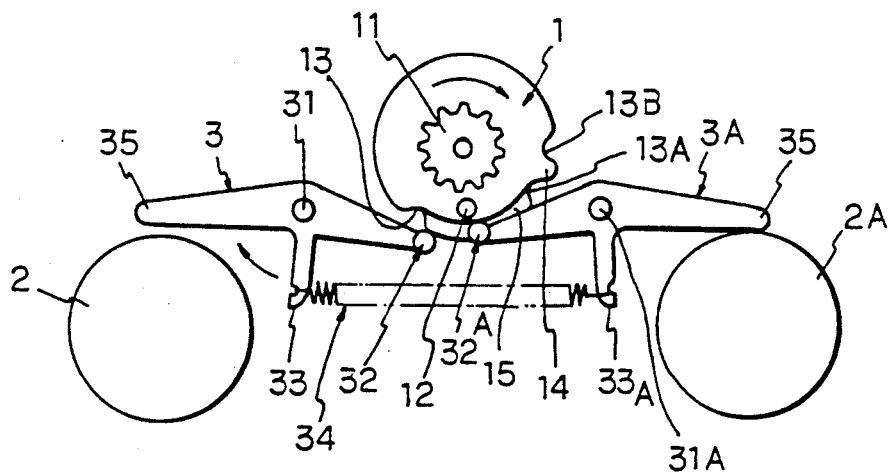

FIG. 2(B) illustrates the state of loading the tape. The control cam 1 is rotated as indicated by arrow according to the power transmission from the loading motor via the gear 11. The longer interlocking pin 32 of the brake arm 3 escapes from the reentrant 13 of the control cam 1 and comes into contact with the circumferential surface of the stepped part 15. Therefore, the brake arm 3 is rotated around the shaft 31 in the clockwise direction. Then, the braking piece 35 is detached from the reel 2 and simultaneously the reel 2 is released from the braking state to load the tape.

Figure 2C:
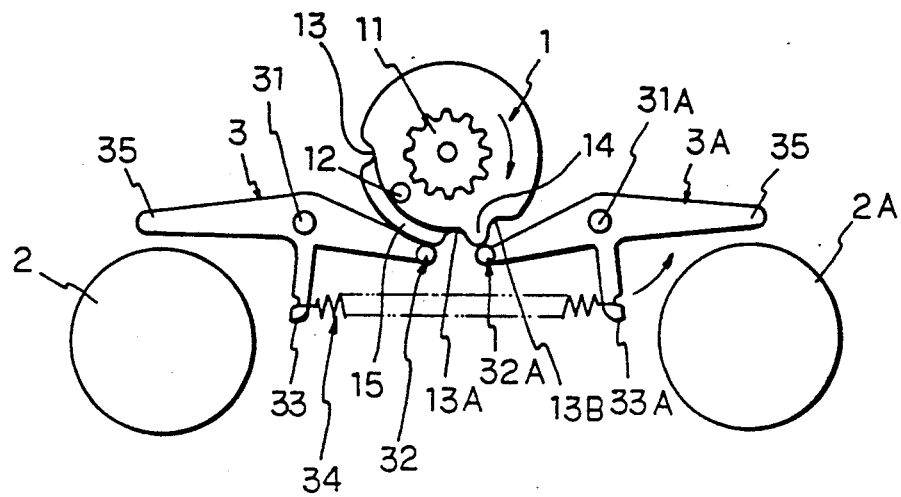

FIG. 2(C) illustrates a state of transferring the tape. When the control cam 1 is continuously rotated as indicated by arrow, the interlocking pin 32 is contacted with the circumferential surface of the stepped part 15 and the interlocking pin 32A contacts with the projection 14. Therefore, both reels 2 and 2A are all released from the braking state.

Figure 2D:
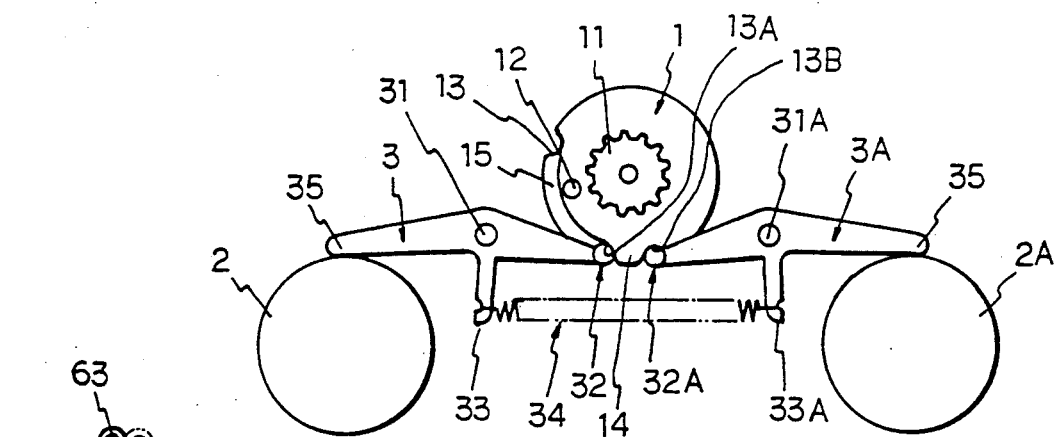

FIG. 2(D) illustrates a state at a stop mode. Since the interlocking pins 32 and 32A are introduced into the reentrants 13A and 13B respectively by the continuous rotation of the control cam 1, both reels 2 and 2A contact with the braking pieces 35 and 35A of the brake arms 3 and 3A respectively which pull each other together by the compression of the tension spring 34. Therefore, the reels 2 and 2A are all in a state of braking.

Figure 2E:
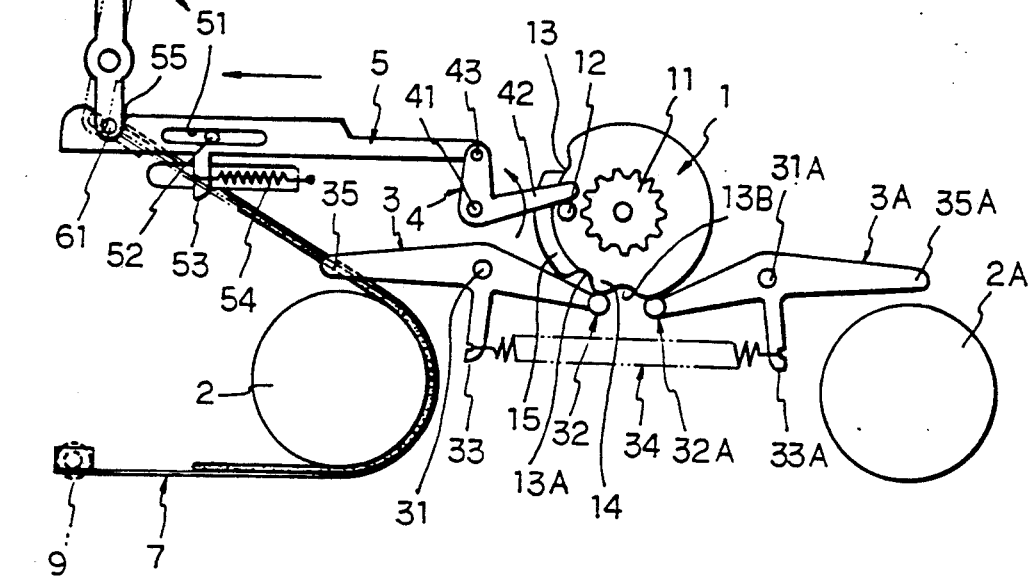
Figure 3:
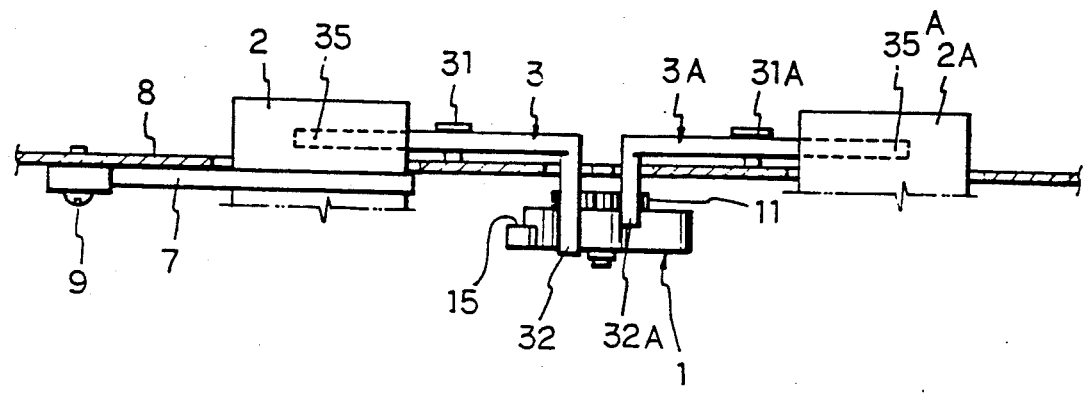
FIG. 3 is a cross sectional view illustrating the essential portion of the apparatus according to the present invention.

FIG. 2(E) illustrates an operating state of the tension band 7 and also a play mode. At this time, the interlocking pin 32 contacts with the projection 14 of the control cam 1 and the interlocking pin 32A contacts with the circumferential of the control cam 1. Then, the braking pieces 3 and 3A are detached from the reels 2 and 2A, respectively, and at the same time, the transmitting pin 12 pushes the one end 42 of the crank 4 to rotate the crank 4 about the shaft 41 in a counterclockwise direction. Therefore, the slide lever 5 which is connected with the other end of the crank 4 by means of the connecting pin 43 moves in the left direction as shown in FIG. 2(E). The tension spring 54 extends, and the braking pin 61 previously hung in the combining recess 55 is pushed toward the left side. Further, since the tension arm 6 rotates in a clockwise direction as shown by an alternate long and short dash line, the tape tension is reduced and one end of the tension band 7, which is rotatably fixed to the braking pin 61, is pulled. Therefore, the tension band 7 brakes the reel 2.

As mentioned above, according to the present invention, since the control cam rotated by the tape loading motor is mounted on the deck to control the brake operations of the reels and the tension band, the configurations simple configurations and the noise can be prevented and the miniaturization can be accomplished.

The invention is in no way limited to the embodiment described hereinabove. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An apparatus for controlling reel brake operation of a tape recorder comprising a deck, a first reel and a second reel rotatably mounted on said deck, and a tape loading motor, said apparatus comprising:

a control cam rotated by power transmitted from said tape loading motor and comprising a camming surface including a projection, recesses, and a stepped part each formed at predetermined circumferential positions, said camming surface being axially divided into a first track and a second track with said stepped part being positioned only in said second track;

a first brake arm and a second brake arm each having an interlocking pin engaging said camming surface of said control cam, said interlocking pins having different lengths so that only the longer interlocking pin engages said stepped part, said first brake arm and said second brake arm for respectively braking said first reel and said second reel simultaneously and selectively;

a crank pivoted by rotation of said control cam;

a slide lever, connected with one end of said crank, to reciprocate horizontally in response to pivoting of said crank;

a tension arm engaged with slide lever to pivot in response to reciprocation of said slide lever; and a tension band, actuated by said tension arm, for braking said first reel.

2. An apparatus as claimed in claim 1, wherein said control cam comprises:

a gear axially mounted on said control cam through which power is transmitted from said tape loading motor and a transmitting pin erected on one side of said control cam and extending parallel to an axis of rotation of said control cam and engaging said crank.

3. An apparatus as claimed in claim 2, wherein said crank has a "V" shape and is pivotally attached to an upper surface of said deck at a vertex of said crank, a first end of said crank being connected with an inner end of said slide lever and a second end of said crank being positioned above said control cam to be engaged by said transmitting pin during rotation of said control cam.

4. An apparatus as claimed in claim 1, wherein:

said control cam is mounted on a lower side of said deck and in proximity to a guide opening formed in said deck; and said control cam comprises a transmitting pin extending parallel to an axis of rotation of said control cam through said guide opening to engage said crank.

5. An apparatus as claimed in claim 4, wherein each of said first brake arm and said second brake arm comprises means formed at a middle portion for attaching ends of a tension spring for urging each said interlocking pin into engagement with said camming surface of said control cam, and wherein each of said first brake arm and said second brake arm is rotatably disposed on a different side of said guide opening on an upper side of said deck with each said interlocking pin extending down through said guide opening to engage said camming surface.

6. An apparatus as claimed in claim 4, wherein said guide opening is substantially "Y" shaped.

7. An apparatus as claimed in claim 4, wherein the interlocking pins of said first brake arm and said second brake arm extend down through said guide opening to engage said control cam.

8. An apparatus as claimed in claim 1, wherein: said tension arm is provided with a braking pin and said slide lever comprises:

a slide slot disposed at a middle portion of said slide lever to slidably engage a guide pin fixedly attached to said deck;

means disposed at a middle front portion of said slide lever for hanging a tension spring attached to said deck; and a recess located at an outer rear portion of said slide lever and engaging said braking pin.

9. An apparatus for controlling reel brake operation of a tape recorder comprising a tape loading motor, a deck, and a pair of reels rotatably mounted on said deck, said apparatus comprising:

a control cam rotated by power transmitted from said tape loading motor and comprising a camming surface including a projection, recesses, and a stepped part each formed at predetermined circumferential positions, wherein said camming surface is axially divided into a first track and a second track and said stepped part is positioned only in said second track; and a first brake arm and a second brake arm, for braking said pair of reels, comprising a first interlocking pin and a second interlocking pin, respectively, said first brake arm and said second brake arm being pivotally urged so that said first interlocking pin and said second interlocking pin are maintained in contact with said camming surface and said first brake arm and said second brake arm being pivotally positioned in response to rotation of said control cam, wherein said first interlocking pin and said second interlocking pin have different lengths so that only said first interlocking pin engages said stepped part;

a crank pivoted by rotation of said control cam;

a slide lever, connected with one end of said crank and reciprocating horizontally in response to pivoting of said crank;

a tension arm engaged with said slide lever and pivoting in response to reciprocation of said slide lever; and a tension band, actuated by said tension arm, to brake said first reel.

10. An apparatus as claimed in claim 9, wherein:

said control cam is mounted on an underside of said deck in proximity to a guide opening formed in said deck and further comprises a transmitting pin extending parallel to an axis of rotation of said control cam through said guide opening to engage said crank in response to rotation of said control cam; and each of said first brake arm and said second brake arm further comprises: means formed at a middle portion of each of said first brake arm and said second brake arm for hanging one end of a tension spring to pivotally urge said first interlocking pin and said second interlocking pin into contact with said camming surface of said control cam, and a braking piece formed at an outer end of each of said first brake arm and said second brake arm.

* * * * *

UNITED STATES PATENT AND TRADEMARK OFFICE
CERTIFICATE OF CORRECTION

PATENT NO. : 5,188,311
DATED : February 23, 1993
INVENTOR(S) : Hwan Y. Choi

It is certified that error appears in the above-indentified patent and that said Letters Patent is hereby corrected as shown below:

On the title page, in the Abstract, change "geat" to --gear--;

Column 2,

Line 1,     replace "9" with --4--;

Column 3,

Lines 51-52,     delete "configurations";

Column 4,

Line 13,     delete "for";

Line 19,     before "slide", insert --said--;

Signed and Sealed this

Fourth Day of October, 1994

Attest:

BRUCE LEHMAN

Attesting Officer      Commissioner of Patents and Trademarks